United States Patent Office 3,234,233
Patented Feb. 8, 1966

---

3,234,233
SUBSTITUTED BICYCLOHEPTANE-2,3-DICARBOXIMIDES
James W. Bolger, Canoga Park, Calif., assignor to Rexall Drug and Chemical Company, Los Angeles, Calif., a corporation of Delaware
No Drawing. Original application July 27, 1962, Ser. No. 213,051, now Patent No. 3,174,979, dated Mar. 23, 1965. Divided and this application Oct. 29, 1963, Ser. No. 319,651
6 Claims. (Cl. 260—326)

This application is a division of my application Serial No. 213,051, filed July 27, 1962, now Patent No. 3,174,979.

This invention relates to compositions of matter classified in the art of chemistry as substituted dicarboximides.

The invention sought to be patented resides in the concept of a chemical compound in which there is attached to the nitrogen atom of an endo-bicyclo-[2,2,1]-heptane-2,3-dicarboximide nucleus or its hereinafter disclosed equivalent, a hydroxy-lower-alkyl group.

The tangible embodiments of this invention possess the inherent general physical characteristics of being, in the form of their acid addition salts, white crystalline solids. Spectral data reveal no unsaturation except as present in the benzene ring of the equivalent 7a-phenyl-substituted compound. The aforementioned physical characteristics, taken together with the nature of the starting materials and the mode of synthesis positively confirm the structure of the compounds sought to be patented.

The tangible embodiments of this invention possess the inherent applied use characteristics of being useful as valuable chemical intermediates in the production of pharmacologically active compounds. For example, treatment of the compounds of this invention with a metal hydride reducing agent, such as lithium aluminum hydride, under reflux in the presence of an inert solvent such as tetrahydrofuran, results in a reduction of the two carbonyl groups to form the corresponding substituted endo-perhydro-4,7-methanoisoindoles which are described and claimed in my application entitled "Carboxylic Acid Esters of N-(Hydroxylalkyl)-Endo Perhydro-4,7-Methanoisoindoles and Intermediates," Serial No. 213,051, filed July 27, 1962, now U.S. Patent No. 3,174,979.

The starting material for the preparation of the tangible embodiments of this invention is the compound bicyclo - [2,2,1] - hept - 5 - ene - 2,3 - endo - dicarboxylic anhydride, or its hereinafter disclosed equivalent which is readily prepared by the general technique described by Diels and Alder, Ann. 460: 98 (1928), by reacting maleic anhydride with cyclopentadiene at room temperature in an inert solvent such as benzene.

The conversion of the starting material to the tangible embodiments of this invention is carried out by the following synthetic pathway:

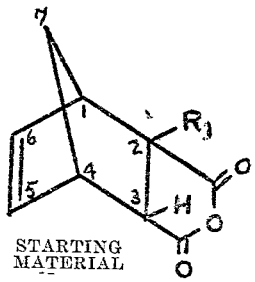
STARTING MATERIAL

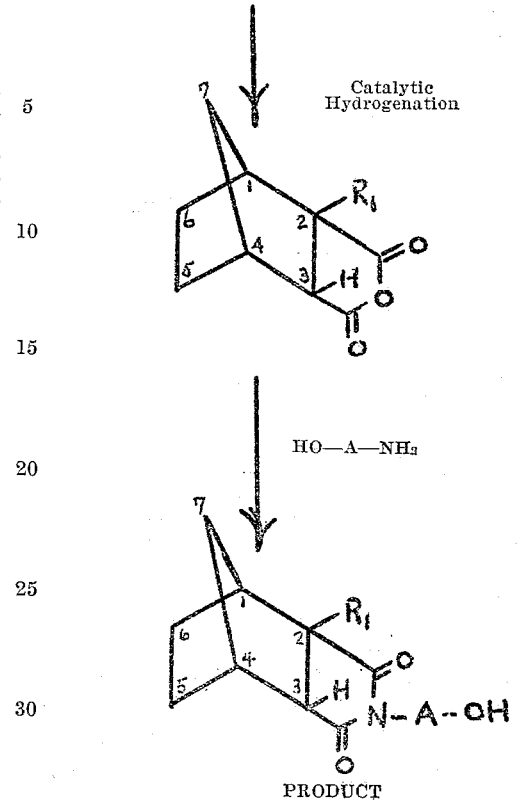
PRODUCT wherein A is lower alkylene and $R_1$ is hydrogen or its hereinafter disclosed equivalents.

As used throughout the specification and in the claims, the terms "lower alkyl," "lower alkylene" and "lower alkoxy" embrace straight and branched chain alkyl, alkylene and alkoxy radicals, respectively, containing 1 to 6 carbon atoms.

Starting materials bearing at the 2-position a lower alkyl or phenyl group, or such groups bearing one or more substituents such as lower alkoxy, halogen, trifluoromethyl, or lower alkyl in the case of phenyl, are the full equivalents of the above described bicyclo-[2,2,1]-hept-5-ene-2,3-endo-dicarboxylic anhydride in the foregoing reaction sequences and are either known compounds or can be prepared in the same manner as described hereinabove by the reaction of cyclopentadiene with an appropriately substituted maleic anhydride. Each of these materials is useful for conducting the foregoing reaction sequences thereby to produce substituted dicarboximide products having the same utility as the specific substituted dicarboximides depicted above.

The initial step in the reaction sequence is the catalytic hydrogenation of the starting material to saturate the double bond between the 5 and 6 position of the bicyclo-[2,2,1]-heptene ring system. The starting materal is dissolved in an inert solvent, such as tetrahydrofuran, and the hydrogenation is carried out in the presence of a noble-metal catalyst, for example platinum, palladium, rhodium, ruthenium and mixtures thereof, preferably on a suitable catalyst support such as carbon. Completion of the reaction is shown by the uptake of one mole of hydrogen per mole of starting material. With active catalysts, such as palladium on carbon, the hydrogenation may be carried out a room temperature to completion. With less active catalyst, for example, Raney nickel, heating of the reaction mixture to a temperature of not more than 100° C. may be necessary to carry the reaction to completion.

The second and final step in the reaction sequence is the conversion of the hydrogenated product to the tangible embodiments of this invention by replacing the ring oxygen atom of the saturated dicarboxylic anhydride structure with a nitrogen atom. The reaction is one of imidation and involves treatment of the dicarboxylic anhydride structure prepared as described above with a hydroxy-lower-alkylamine.

The reaction of endo-bicyclo-[2,2,1]-heptane-2,3-dicarboxylic anhydride or its 2-substituted equivalents with a hydroxy-lower-alkylamine is carried out by heating the reactants together at temperatures of from about 80° C. to about 200° C. The solid product obtained upon cooling the reaction mixture after completion of the reaction is purified by crystallization from organic solvents such as benzene and mixtures of tetrahydrofuran and chloroform.

As an alternate procedure, the reaction can be carried out by, first, treating the anhydride with a lower alkanol to open the anhydride ring and form a half methyl ester of the corresponding acid, and, second, treating the so-produced half-ester with a mixture of the imidating agent and methanol, thereby to produce the dicarboximide which constitutes the desired product.

The best mode contemplated by the inventor of carrying out this invention will now be set forth as follows:

EXAMPLE 1

(a) *Bicyclo-[2,2,1]-heptane-2-methyl-2,3-endo-dicarboxylic anhydride*

Bicyclo - [2,2,1] - hept - 5 - ene - 2 - methyl - 2,3-endo-dicarboxylic anhydride, (188 g., 1.06 moles) is dissolved in 500 ml. of ethyl acetate. 10% palladium on carbon catalyst is added and the mixture is hydrogenated for one hour at 40 p.s.i. and at room temperature (100% hydrogen uptake). The catalyst is removed by filtration and the filtrate is reduced in vacuo to a dry white solid. Yield: 184 g. (97%) of white crystals, M.P. 126–128° C.

(b) *N-(2'-hydroxyethyl)-bicyclo-[2,2,1]-heptane-2-methyl-2,3-endo-dicarboximide*

The anhydride formed in step "a" (174 g., 0.967 mole) is mixed with ethanolamine (59 g., 0.967 mole). The resulting mixture is heated at 180° C. for two hours allowing the water formed to distill from the reaction. The resulting melt is cooled and poured into petroleum-ether (30°–60° C. boiling range) and crystallization induced. Yield: 206 g. (95%) of white crystals, M.P. 62–63° C.

The following examples illustrate the preparation of other tangible embodiments of this invention:

EXAMPLE 2

(a) *Bicyclo-[2,2,1]-heptane-2-phenyl-2,3-endo-dicarboxylic anhydride*

Phenylmaleic anhydride (49 g., 0.282 mole), is mixed with cyclopentadiene (19.0 g., 0.284 mole) and 250 ml. of benzene. The resulting solution is kept at 50° C. and under a nitrogen atmosphere for 24 hours. Then 3 g. of 10% palladium on carbon catalyst is added and the mixture hydrogenated at room temperature and at 40 p.s.i. (100% hydrogen uptake). The catalyst is removed by filtration and the solution reduced to an oil in vacuo. The oil is crystallized by adding petroleum-ether (30°–60° C. boiling range). The crude white crystals are recrystallized from methylene chloride and petroleum-ether (30°–60° C. boiling range). Yield: 58 g. (84%); M.P. 70–71° C.

(b) *N-(2'-hydroxyethyl)-bicyclo-[2,2,1]-heptane-2-phenyl-2,3-endo-dicarboximide*

The anhydride formed according to step "a" (50 g., 0.206 mole) is mixed with 2-aminoethanol (13 g., 0.214 mole). The mixture is heated at 170° C. for two hours. The water formed in the reaction is allowed to distill off during the heating period. The resulting cooled melt is poured into cyclohexane and crystallization induced. The crude white product is recrystallized from ethanol/water. Yield: 50 g. (80%), M.P. 144–145° C.

*Analysis.*—Calculated for $C_{17}H_{19}NO_3$: C, 71.56%; H, 6.71%; N, 4.91%. Found: C, 71.31%; H, 6.72%; N, 4.81%.

EXAMPLE 3

*N-(3'-hydroxypropyl)-bicyclo-[2,2,1]-heptane-2,3-endo-dicarboximide*

Bicyclo-[2,2,1]-heptane-2,3 - endo - dicarboxylic anhydride (200 g.) is prepared by the catalytic hydrogenation of bicyclo-[2,2,1]-hept-5-ene-2,3-endo-dicarboxylic anhydride by the technique described in Example 1(a), is mixed with 235 g. methanol and the resulting solution is of 3-aminopropanol. The excess methanol and aminoto about 300 ml. and then diluted with 150 g. (2.0 moles) of 3-aminopropanol. The excess methano land aminopropanol is removed by distillation until the temperature reaches 190° C. The resulting imide is dissolved in chloroform, washed with dilute hydrochloric acid, dried over magnesium sulfate and then concentrated in vacuo. Yield: 222 g.

EXAMPLE 4

*N-(2'-hydroxypropyl)-bicyclo-[2,2,1]-heptane-2,3-endo-dicarboximide*

Bicyclo-[2,2,1]-heptane-2,3 - endo-dicarboxylic anhydride (66.5 g., 0.4 mole) and 1-methylethanolamine (30 g., 0.4 mole) are mixed together and the mixture is heated at 170° C. for two hours. During the heating, the water formed is distilled off. The melt is cooled and poured into petroleum ether (30°–60° C. boiling range). By scratching, white crystals are obtained. The crude product is recrystallized from methylene chloride/petroleum ether (30°–60° C. boiling range). Yield: 73 g. (82%), M.P. 109–110° C.

*Analysis.*—Calculated for $C_{12}H_{17}NO_3$: C, 64.55%; H, 7.67%; N, 6.27%. Found: C, 65.03%; H, 7.12%; N, 6.81%.

EXAMPLE 5

*N-(2'-hydroxy-1'-methylethyl)-bicyclo-[2,2,1]-heptane-2,3-endo-dicarboximide*

Bicyclo - [2,2,1] - heptane - 2,3 - endo - dicarboxylic anhydride (66.5 g., 0.4 mole) is mixed with 2-amino-1-propanol (30 g., 0.4 mole). The mixture is then heated at 170° C. for two hours. During the heating period the water formed is allowed to distill off. The dark melt is cooled and poured into petroleum ether (30°–60° C. boiling range). By scratching the insoluble oil, light brown crystals are obtained. Yield: 73 g.

The subject matter which the applicant regards as his invention is particularly pointed out and distinctly claimed as follows:

1. A compound of the formula

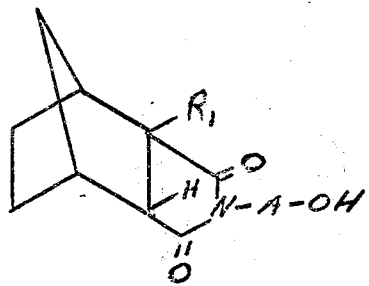

wherein $R_1$ is a member selected from the group consisting of hydrogen, phenyl and lower alkyl and A is lower alkylene.

2. N-(2'-hydroxyethyl)-bicyclo-[2,2,1]-heptane-2-methyl-2,3-endo-dicarboximide.

3. N-(2'-hydroxyethyl)-bicyclo-[2,2,1]-heptane-phenyl-2-3-endo-dicarboximide.

4. N-(3'-hydroxypropyl)-bicyclo-[2,2,1]-heptane-2,3-endo-dicarboximide.

5. N-(2'-hydroxypropyl)-bicyclo-[2,2,1]-heptane-2,3-endo-dicarboximide.

6. N-(2'-hydroxy-1'-methylethyl)-bicyclo-[2,2,1]-heptane-2,3-endo-dicarboximide.

No references cited.

NICHOLAS S. RIZZO, *Primary Examiner.*